United States Patent
Hoshikawa et al.

(10) Patent No.: US 7,671,123 B2
(45) Date of Patent: Mar. 2, 2010

(54) FLUORORESIN AQUEOUS DISPERSION WITH POLYOXYALKYLENE ESTER SURFACTANT

(75) Inventors: Jun Hoshikawa, Tokyo (JP); Shinya Higuchi, Tokyo (JP); Yasuhiko Matsuoka, Tokyo (JP); Nobuyuki Yamagishi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 339 days.

(21) Appl. No.: 11/776,848

(22) Filed: Jul. 12, 2007

(65) Prior Publication Data
US 2008/0033063 A1 Feb. 7, 2008

Related U.S. Application Data
(60) Provisional application No. 60/835,872, filed on Aug. 7, 2006, provisional application No. 60/830,689, filed on Jul. 14, 2006.

(30) Foreign Application Priority Data
Jul. 12, 2006 (JP) ............................. 2006-191188
Aug. 2, 2006 (JP) ............................. 2006-210740

(51) Int. Cl.
*C08L 27/12* (2006.01)
*C08L 27/18* (2006.01)
*C08L 71/02* (2006.01)
*C08K 5/05* (2006.01)
*C08K 5/06* (2006.01)
*C08K 5/095* (2006.01)
*C08K 5/101* (2006.01)

(52) U.S. Cl. .................. 524/366; 524/319; 524/376; 524/378; 524/544; 524/345; 524/546

(58) Field of Classification Search ................. 524/319, 524/376, 378, 544, 545, 546, 366
See application file for complete search history.

(56) References Cited

U.S. PATENT DOCUMENTS

| 6,153,688 | A | * | 11/2000 | Miura et al. ................. 524/546 |
| 6,498,207 | B1 | * | 12/2002 | Hoshikawa et al. ......... 524/378 |
| 7,141,620 | B2 | | 11/2006 | Hoshikawa et al. |
| 7,238,735 | B2 | | 7/2007 | Hoshikawa et al. |
| 2006/0276574 | A1 | | 12/2006 | Hoshikawa et al. |
| 2007/0015857 | A1 | | 1/2007 | Hoshikawa et al. |

FOREIGN PATENT DOCUMENTS

| JP | 55-120630 | 9/1980 |
| JP | 8-269285 | 10/1996 |
| JP | 11-240993 | 9/1999 |
| WO | 00/35971 | 6/2000 |
| WO | 03/078479 | 9/2003 |

OTHER PUBLICATIONS

Fluororesin Handbook, compiled by Takaomi Satokawa, published by Nikkan Kogyo Shinbun, 1990, pp. 28-29, 32-33, and 204-205.
Suwa, T., et al., "Melting and Crystallization Behavior of Poly(tetrafluoroethylene). New Method for Molecular Weight Measurement of Poly(tetrafluoroethylene) Using a Differential Scanning Calorimeter," Journal of Applied Polymer Science vol. 17, 1973, pp. 3253-3257.

* cited by examiner

*Primary Examiner*—Kelechi C Egwim
(74) *Attorney, Agent, or Firm*—Oblon, Spivak, McClelland, Maier & Neustadt, L.L.P.

(57) ABSTRACT

A fluororesin aqueous dispersion comprising from 20 to 70 mass % of microparticles of a fluororesin and from 1 to 12 mass %, based on the mass of the fluororesin, of a non-ionic surfactant represented by the formula (1):

$$R^1\text{—O-A-X} \qquad (1)$$

wherein $R^1$ is a $C_{6-18}$ alkyl group, O is an oxygen atom, A is a polyoxyalkylene group comprising from 1 to 3 oxybutylene groups and from 5 to 20 oxyethylene groups, and X is a hydrogen atom or a methyl group.

8 Claims, No Drawings

FLUORORESIN AQUEOUS DISPERSION WITH POLYOXYALKYLENE ESTER SURFACTANT

The present invention relates to a fluororesin aqueous dispersion containing microparticles of a fluororesin.

A fluororesin aqueous dispersion containing microparticles of a fluororesin is widely used for applications wherein the characteristics of a fluororesin such as heat resistance, chemical resistance, non-tackiness, self-lubricating property, weather resistance and water and oil repellency, are utilized. A fluororesin is usually produced by an emulsion polymerization method. For example, a polytetrafluoroethylene (hereinafter referred to as PTFE) by an emulsion polymerization method is obtained in the form of an aqueous fluororesin emulsion having microparticles of PTFE having an average particle size of from 0.1 to 0.5 μm dispersed by polymerizing tetrafluoroethylene (hereinafter referred to as TFE) alone or copolymerizing it with a comonomer while a mixture comprising pure water, a peroxide type polymerization initiator, an anionic fluorinated surfactant and a higher paraffin as a polymerization stabilizer, is stirred (Non-Patent Document 1).

This aqueous fluororesin emulsion tends to undergo agglomeration and is unstable. Therefore, it has been common that to such an aqueous fluororesin emulsion, a polyoxyethylene alkyl phenyl ether type non-ionic surfactant such as Triton X100 manufactured by Union Carbide Corporation which has an average molecular structure of $C_8H_{17}C_6H_4O(C_2H_4O)_{10}H$, is added to obtain a stabilized PTFE low concentration aqueous dispersion, or that such a PTFE low concentration aqueous dispersion is concentrated by means of a known method such as electrophoresis or phase separation to obtain a PTFE high concentration aqueous dispersion, or that in order to provide stability for storage for a long time or to impart a liquid property such as viscosity suitable for various applications, at least one of water, ammonia, a surfactant and other components is added to obtain a PTFE aqueous dispersion.

However, such a conventional PTFE aqueous dispersion using a polyoxyethylene alkyl phenyl ether type non-ionic surfactant has had the following problems.

(1) When the PTFE aqueous dispersion is applied to form a coating, which is then baked at a temperature of at least the melting point of PTFE, e.g. at 380° C. for 10 minutes, a PTFE coating film thereby formed tends to be colored yellow, and such yellowing tends to be distinctive as the thickness increases. The cause for such yellowing is considered to be a tar component which remains in the PTFE coating film as a heat decomposition residue of the polyoxyethylene alkyl phenyl ether.

(2) If bubbles are formed in the PTFE aqueous dispersion during the process, they tend to hardly disappear, and if such bubbles are attached to a product, they will cause non-uniformity in the thickness of the coating film, thus forming defects in the product.

(3) In a case where it is desired to obtain a thick coating film, if thick coating is applied all at once, cracking is likely. Accordingly, it is necessary to repeatedly apply the PTFE aqueous dispersion in a thickness of at most a certain level. However, the surface of the PTFE is very much likely to repel the PTFE aqueous dispersion, thus leading to a cissing phenomenon, whereby at a part of the PTFE coating film, there will be a portion where the PTFE aqueous dispersion can not be applied, and the cissing trace will be an irregularity in the thickness of the PTFE coating film, thus leading to defects in the product.

(4) The PTFE aqueous dispersion will be rapidly thickened at a temperature of at least a certain level, and accordingly, it is necessary to control the temperature during the coating to stabilize the coating thickness. However, usually, the site where the coating is carried out is adjacent to a baking furnace, whereby the room temperature is likely to increase and difficult to adjust in many cases. It is possible to increase the thickening temperature of the PTFE aqueous dispersion by adjusting the incorporation of the surfactant, but the surface tension of the liquid tends to be high, and cissing is likely to result.

Further, an aqueous dispersion of fluororesin other than PTFE also has had the same problems.

As a method to solve the above problem (1), a method of using a polyoxyethylene alkyl ether type surfactant has been proposed (Patent Document 1), and it is disclosed that no coloration is observed after the baking. However, even when this compound is employed, the problems (2), (3) and (4) can not be solved.

Further, a method of using an alkyl ether type surfactant having an oxyethylene group and an oxypropylene group has been proposed (Patent Document 2), and it is disclosed that there is no coloration after the baking, and the defoaming property is good. However, even when this compound is employed, the problems (3) and (4) can not adequately be solved.

The present invention has been made in view of the above problems of the prior art, and it is an object of the present invention to provide a fluororesin aqueous dispersion, whereby there is no coloration after the baking, the defoaming property is good, no cissing of the fluororesin aqueous dispersion is observed during the coating, and the viscosity scarcely increases even at a high temperature, so that it can suitably be used.

In the present invention, the fluororesin aqueous dispersion is a general term for a low concentration fluororesin aqueous dispersion obtainable by dissolving a non-ionic surfactant to an aqueous fluororesin emulsion, a high concentration fluororesin aqueous dispersion obtainable by concentrating such a low concentration fluororesin aqueous dispersion, and a fluororesin aqueous dispersion obtainable by incorporating a non-ionic surfactant or at least one member of other components to such a low concentration fluororesin aqueous dispersion or a high concentration fluororesin aqueous dispersion.

Non-Patent Document 1: Fluororesin Handbook, p. 28, compiled by Takaomi Satokawa, published by Nikkan Kogyo Shinbun Patent Document 1: JP-A-8-269285 (U.S. Pat. No. 6,153, 688)

Patent Document 2: JP-A-11-240993 (U.S. Pat. No. 6,498, 207)

The present inventors have conducted an extensive study to overcome the above difficulties and as a result, have found it possible to solve the above-mentioned problems by incorporating a non-ionic surfactant having a specific molecular structure. Thus, the present invention has been accomplished.

Namely, the present invention provides a fluororesin aqueous dispersion comprising from 20 to 70 mass % of microparticles of a fluororesin and from 1 to 12 mass %, based on the mass of the fluororesin, of a non-ionic surfactant represented by the formula (1):

$$R^1—O-A-X \tag{1}$$

wherein $R^1$ is a $C_{6-18}$ alkyl group, O is an oxygen atom, A is a polyoxyalkylene group comprising from 1 to 3 oxybutylene groups and from 5 to 20 oxyethylene groups, and X is a hydrogen atom or a methyl group.

Further, the present invention provides such a fluororesin aqueous dispersion which contains, in addition to the non-ionic surfactant represented by the formula (1), a non-ionic surfactant having no oxybutylene groups, wherein as an average value in the entire non-ionic surfactant, the number of oxybutylene groups per molecule of the non-ionic surfactant is from 0.5 to 2.

Further, the present invention provides such a fluororesin aqueous dispersion which further contains a fluorinated surfactant, wherein the content of the fluorinated surfactant is at most 0.2 mass % based on the mass of the fluororesin.

Further, the present invention provides such a fluororesin aqueous dispersion wherein the fluorinated surfactant is a fluorinated surfactant represented by the following formula (2):

$$R^2\text{---}COOY \quad (2)$$

wherein $R^2$ is a fluoroalkyl group having from 90 to 100% of hydrogen atoms in a $C_{5-9}$ alkyl group which may contain one or two etheric oxygen atoms, substituted by fluorine atoms, O is an oxygen atom, and Y is an ammonium ion.

In the fluororesin aqueous dispersion of the present invention, the contained non-ionic surfactant has a thermal decomposition temperature of from 200 to 350° C., and it undergoes thermal decomposition almost completely in the step of baking the fluororesin which is carried out usually at a temperature of from 350 to 395° C., whereby there remains substantially no residue, and coloration of the coating film after the baking is prevented.

Further, the fluororesin aqueous dispersion of the present invention has a good defoaming property and thus is has a merit in that bubbles formed in the fluororesin aqueous dispersion by e.g. stirring operation will readily disappear, and defects will scarcely form on the product.

Further, with the fluororesin aqueous dispersion of the present invention, no cissing of the fluororesin aqueous dispersion will take place during the coating, and the viscosity tends to scarcely increase even at a high temperature. Further, since the thickening temperature is high, the thickness of the coating film will be stabilized. Further, with the fluororesin aqueous dispersion of the present invention, the dispersion stability of microparticles of the fluororesin is good, and formation of agglomerates in a shear stability test (method of examining the amount of formed agglomerates by recycling operation for a specified time by a pump) is little, and the stability against stirring is also good.

The microparticles of a fluororesin to be used for the fluororesin aqueous dispersion of the present invention, are ones polymerized by an emulsion polymerization method.

The emulsion polymerization method is a polymerization method wherein a fluororesin monomer having a vinyl group is homo-polymerized or co-polymerized in an aqueous medium to obtain an aqueous fluororesin emulsion. The emulsion polymerization method of a fluororesin is usually carried out by homo-polymerization or co-polymerization of a fluororesin monomer while a mixture of water, a polymerization initiator, a surfactant, etc. is stirred. For example, as an emulsion polymerization suitable for PTFE, a method may, for example, be mentioned wherein polymerization is carried out in a pressure-resistant autoclave by injecting TFE under pressure while a mixture of water, a polymerization initiator, an anionic fluorine type surfactant, a polymerization stabilizer such as paraffin wax, etc. is stirred.

As the polymerization initiator, at least one of a persulfate such as ammonium persulfate or potassium persulfate, a water-soluble organic peroxide such as disuccinic acid peroxide, diglutaric acid peroxide or tert-butyl hydroperoxide, and a redox stabilizer by a combination of a reducing agent with a chlorate, bromate or permanganate, may be used.

As the polymerization stabilizer, a higher paraffin may, for example, be mentioned.

The polymerization temperature is not particularly limited, but it is usually preferably from 30 to 100° C., particularly preferably from 50 to 90° C.

As the anionic fluorinated surfactant, a fluorinated surfactant of the formula (2) is used.

$$R^2\text{---}COOY \quad (2)$$

wherein $R^2$ is a fluoroalkyl group having from 90 to 100% of hydrogen atoms in a $C_{5-9}$ alkyl group which may contain one or two etheric oxygen atoms, substituted by fluorine atoms, O is an oxygen atom, and Y is an ammonium ion.

Specific examples of the fluorinated surfactant of the formula (2) include $C_7F_{15}COONH_4$, $HC_7F_{14}COONH_4$, $C_6F_{13}COONH_4$, $HC_6F_{12}COONH_4$, $C_8F_{17}COONH_4$, $C_4F_9OC_2F_4OCF_2COONH_4$, $C_2F_5OC_2F_4OCF_2COONH_4$, $C_3F_7OCF(CF_3)CF_2OCF(CF_3)COONH_4$, $C_2F_5OCF(CF_3)CF_2OCF(CF_3)COONH_4$ and $C_4F_9OCF(CF_3)COONH_4$. $C_7F_{15}COONH_4$ (ammonium perfluorooctanoate) or $C_2F_5OC_2F_4OCF_2COONH_4$ is preferred, since the polymerization process is thereby stabilized.

The fluorinated surfactant of the formula (2) is used preferably in an amount of from 0.05 to 1.0 mass % based on the mass of the finally obtainable PTFE, during the polymerization for PTFE, and it is more preferably in an amount of from 0.1 to 0.5 mass %, further preferably from 0.15 to 0.3 mass %, based on the mass of PTFE. If it is less than this range, microparticles of PTFE tend to agglomerate, whereby the yield of the product decreases, and if it exceeds this range, PTFE tends to be hardly obtainable in the form of microparticles. The fluorinated surfactant may be dissolved in water before initiation of the polymerization reaction, or may be injected in the form of an aqueous solution into the autoclave during the polymerization.

Further, the fluorinated surfactant of the formula (2) is hardly decomposable in a natural environment, and accordingly, it is advisable to suppress its concentration in the PTFE aqueous dispersion to be low. As a method for suppressing the concentration to be low, the amount of its use may be minimized for the polymerization. Otherwise, the concentration of the fluorinated surfactant may be reduced by a known method such as a method of removing the fluorinated surfactant from the supernatant during the concentration, as disclosed in WO03/078479, a method of employing an anion exchange resin as disclosed in WO00/35971 or a method by means of ultrafiltration as disclosed in JP-A-55-120630.

The content of the fluorinated surfactant of the formula (2) in the PTFE aqueous dispersion of the present invention is preferably at most 0.2 mass %, more preferably at most 0.18 mass %, further preferably at most 0.1 mass %, still more preferably at most 0.05 mass %, particularly preferably at most 0.01 mass %, based on the mass of PTFE.

The PTFE concentration in the aqueous PTFE emulsion is usually from 10 to 50 mass %, and the PTFE concentration is preferably from 15 to 40 mass %, particularly preferably from 20 to 35 mass %. If the PTFE concentration is lower than this range, not only the production efficiency tends to be low, but also the molecular weight of PTFE tends to be low, whereby the physical properties such as the mechanical strength, tend to deteriorate. On the other hand, if the PTFE concentration exceeds this range, the yield during the polymerization tends to be low.

The microparticles of PTFE to be used in the present invention are ones having an average particle diameter of from 0.10 to 0.50 μm, ones having an average particle diameter of from 0.15 to 0.40 μm are preferred, and ones having an average particle diameter of from 0.20 to 0.35 μm are particularly preferred. If the average particle diameter is too small, the molecular weight of PTFE becomes low, and the mechanical properties as a PTFE product tend to deteriorate, and if it is too large, sedimentation of the microparticles of PTFE tends to be too fast, whereby the storage stability tends to be poor, such being undesirable.

The number average molecular weight of PTFE may be optionally selected, but it is preferably within a range of from 500,000 to 30,000,000, particularly preferably within a range of from 1,000,000 to 25,000,000. If it is smaller than this range, the mechanical properties of PTFE tend to deteriorate, and if it is larger than this range, industrial production tends to be difficult.

In the foregoing, the emulsion polymerization method and the concentration and the average particle diameter in the aqueous fluororesin emulsion have been described primarily with respect to PTFE, but the above descriptions may likewise be applicable to other fluororesins than PTFE.

In the present invention, the fluororesin is meant for a polymer obtainable by an emulsion polymerization method, such as PTFE, PFA (tetrafluoroethylene/perfluoro(alkyl vinyl ether) copolymer), FEP (tetrafluoroethylene/hexafluoropropylene copolymer) or PVDF (vinylidene fluoride polymer). The perfluoroalkyl vinyl ether may, for example, be perfluoromethyl vinyl ether, perfluoroethyl vinyl ether or perfluoropropyl vinyl ether, and it may be one of them or two or more of them in combination. Further, PTFE includes not only a homopolymer of TFE but also a so-called modified PTFE containing polymerized units based on a copolymer component copolymerizable with TFE, such as a halogenated ethylene such as chlorotrifluoroethylene, a halogenated propylene such as hexafluoropropylene or a fluorovinyl ether such as perfluoro(alkyl vinyl ether) in a very small amount at a level not to substantially impart melt-processability.

The microparticles of a fluororesin contained in the fluororesin aqueous dispersion of the present invention may be ones having a structure wherein the outer layer and the interior have different fluororesin compositions or different molecular weight distributions. Further, they may have plural structures wherein two or more layers have plural compositions or different molecular weight distributions, and such compositions or molecular weight distributions of these layers may change continuously. For example, they may be ones wherein the pattern of addition of the polymerization initiator is changed during the polymerization of tetrafluoroethylene so that the outer layer may be made to be high molecular weight PTFE or low molecular weight PTFE, ones wherein a copolymerizable monomer is injected at a later stage of the polymerization of tetrafluoroethylene so that the outer layer is made to be a copolymer, or ones wherein chlorotrifluoroethylene is injected only at the initial stage of the polymerization and thereafter, tetrafluoroethylene is polymerized so that the interior is made to be a copolymer.

The concentration of the fluororesin in the fluororesin aqueous dispersion of the present invention is usually from 20 to 70 mass %, preferably from 35 to 67 mass %, more preferably from 50 to 65 mass %. If the fluororesin concentration is too low, the viscosity of the fluororesin aqueous dispersion tends to be low, whereby the storage stability will be inadequate. On the other hand, if the fluororesin concentration is too high, the viscosity will be high, and processing tends to be difficult.

The fluororesin aqueous dispersion of the present invention contains the above-mentioned non-ionic surfactant of the formula (1). In the formula (1), the carbon number of the alkyl group represented by $R^1$ is within a range of from 6 to 18 to be suitable for the present invention, but it is preferably from 8 to 16, more preferably from 10 to 14. If the carbon number of the alkyl group is too small, the surface tension of the fluororesin aqueous dispersion tends to be high, and the wettability tends to deteriorate. On the other hand, if the carbon number of the alkyl group is too large, the storage stability of the fluororesin aqueous dispersion will be impaired when the dispersion is left to stand. When the carbon number of the alkyl group is within the above range, the wettability is good, and the storage stability is also good.

The alkyl group represented by $R^1$ preferably has a branched structure, whereby the wettability will be better, and a suitable aqueous dispersion can be obtained. The carbon atom having a branch may be a secondary carbon atom or a tertiary carbon atom, but preferably it is a secondary carbon atom. Suitable specific examples of the alkyl group having a branched structure include, for example, $C_{10}H_{21}CH(CH_3)CH_2$—, $C_9H_{19}CH(C_3H_7)$—, $C_6H_{13}CH(C_6H_{13})$—, and $CH(CH_3)_2CH_2CH(CH_2CH(CH_3)_2)$—.

The alkyl group represented by $R^1$ may be one wherein at most 10% of hydrogen atoms in the alkyl group may be substituted by halogen atoms such as fluorine, chlorine or bromine. Further, the alkyl group may have one or two unsaturated bonds therein.

A in the formula (1) is a polyoxyalkylene chain having from 1 to 3 oxybutylene groups and from 5 to 20 oxyethylene groups. The number of oxybutylene groups is preferably from 1 to 2.5, particularly preferably from 1 to 2. If it is higher than this range, the viscosity increase or the stability deterioration of the fluororesin aqueous dispersion is likely to result, and if it is less than this range, the defoaming property, wettability or viscosity characteristic of the fluororesin aqueous dispersion composition tends to be poor. When it is within this range, the properties such as the viscosity, stability, defoaming property, wettability, etc. will be good, such being desirable.

Further, the oxybutylene groups may be branched ones or linear ones, but branched ones are preferred.

Specific examples of the oxybutylene group include, for example, —$CH_2$—$CH(C_2H_5)$—O—, —$CH(C_2H_5)CH_2$—O—, —$CH(CH_3)$—$CH(CH_3)$—O—, —$CH_2CH_2$—$CH(CH_3)$—O— and —$CH_2CH_2CH_2CH_2$—O—. Among them, —$CH_2$—$CH(C_2H_5)$—O—, —$CH(C_2H_5)CH_2$—O— or —$CH_2CH_2$—$CH(CH_3)$—O— is preferred. As materials for oxybutylene groups, various butylene oxides may be mentioned, and specific examples include, for example, 1,2-butylene oxide, 2,3-butylene oxide, tetrahydrofuran, and methyloxetane.

The number of oxyethylene groups in the polyoxyalkylene chain is from 5 to 20, preferably from 6 to 15, particularly preferably from 7 to 12. If the number is too small, the microparticles of the fluororesin tend to readily undergo sedimentation, whereby the storage stability of the aqueous dispersion composition tends to be poor. On the other hand, if the number is too large, the wettability tends to be low, such being undesirable. When it is within this range, the properties such as the viscosity, stability, defoaming property and wettability, will be good, such being desirable.

The oxybutylene groups in the polyoxyalkylene chain may have a block structure or a random structure.

The oxybutylene groups may be present at any portions in the polyoxyalkylene chain, but preferably present within a range of up to 70% of the entire length of the polyoxyalkylene chain from the $R^1$—O— group side, more preferably within a range up to 50% of the entire length of the polyoxyalkylene chain from the $R^1$—O— group side. The portion bonded to the $R^1$—O— group in the polyoxyalkylene chain is preferably an oxybutylene group, more preferably a polyoxybutylene chain composed of one or two oxybutylene groups. Further, the portion bonded to the X group in the polyoxyalkylene chain is preferably an oxyethylene group and more preferably a polyoxyethylene chain composed of from 5 to 20 oxyethylene groups.

Such a polyoxyalkylene chain having a preferred structure is preferred, since the properties such as the viscosity, stability, defoaming property and wettability, are thereby better.

Further, X in the formula (1) is a hydrogen atom or a methyl group, preferably a hydrogen atom.

The non-ionic surfactant of the formula (1) may be obtained by addition reaction of butylene oxide and ethylene oxide to a higher alcohol by a known method. Further, butylene oxide and ethylene oxide may be mixed and simultaneously reacted, or butylene oxide may be reacted first, and then ethylene oxide may be reacted, or ethylene oxide may be reacted first, and then butylene oxide may be reacted. However, it is preferred that butylene oxide is reacted first, and then ethylene oxide is reacted.

Specific examples of the non-ionic surfactant of the formula (1) include, for example, $C_{13}H_{27}OCH_2CH(C_2H_5)O(C_2H_4O)_8H$, $C_{10}H_{21}CH(CH_3)CH_2OCH_2CH(C_2H_5)O(C_2H_4O)_8H$, $C_{10}H_{21}CH(CH_3)CH_2OCH(C_2H_5)CH_2O(C_2H_4O)_8H$, $C_{12}H_{25}OCH_2CH(C_2H_5)O(C_2H_4O)_8H$, $C_8H_{17}OCH_2CH(C_2H_5)O(C_2H_4O)_{10}H$, $C_{12}H_{25}OCH_2CH(C_2H_5)O(C_2H_4O)_{10}H$, $C_{13}H_{27}OCH_2CH(C_2H_5)O(C_2H_4O)_{11}H$, $C_{13}H_{27}OCH_2CH_2OCH(C_2H_5)O(C_2H_4O)_8H$, $C_{12}H_{25}O(CH_3CH(C_2H_5)O)_2(C_2H_4O)_8H$, $C_{10}H_{21}CH(CH_3)CH_2O(C_2H_4O)_9CH_2CH(C_2H_5)$ OH, $C_{16}H_{33}OC_2H_4OCH(C_2H_5)CH_2O(C_2H_4O)_9H$, $C_{12}H_{25}OCH(C_2H_5)O(C_2H_4O)_8CH_2CH(C_2H_5)OH$, $C_{13}H_{27}OCH(CH_3)CH(CH_3)O(C_2H_4O)_8H$, $C_{10}H_{21}CH(CH_3)CH_2OCH(CH_3)CH(CH_3)O(C_2H_4O)_8H$, $C_{10}H_{21}CH(CH_3)CH_2OCH(CH_3)CH(CH_3)O(C_2H_4O)_8H$, $C_{12}H_{25}OCH(CH_3)CH(CH_3)O(C_2H_4O)_8H$, $C_8H_{17}OCH(CH_3)CH(CH_3)O(C_2H_4O)_{10}H$, $C_{12}H_{25}OCH(CH_3)CH(CH_3)O(C_2H_4O)_{10}H$, $C_{13}H_{27}OCH(CH_3)CH(CH_3)O(C_2H_4O)_{11}H$, $C_{13}H_{27}O(CH_2)_4O(C_2H_4O)_8H$, $C_{12}H_{25}O(CH_2)_4O(C_2H_4O)_8H$, $C_8H_{17}O(CH_2)_4O(C_2H_4O)_{10}H$, $C_{12}H_{25}O(CH_2)_4O(C_2H_4O)_{10}H$, $C_{13}H_{27}O(CH_2)_4O(C_2H_4O)_{11}H$, $C_{13}H_{27}O(CH_2)_2CH(CH_3)O(C_2H_4O)_8H$, $C_{12}H_{25}O(CH_2)_2CH(CH_3)O(C_2H_4O)_8H$, $C_8H_{17}O(CH_2)_2CH(CH_3)O(C_2H_4O)_{10}H$, $C_{12}H_{25}O(CH_2)_2CH(CH_3)O(C_2H_4O)_{10}H$, and $C_{13}H_{27}O(CH_2)_2CH(CH_3)O(C_2H_4O)_{11}H$.

Further, usually, the non-ionic surfactant is a mixture of plural molecules having a certain chain length distribution and having isomers mixed, and the chain length in the formula (1) represents an average chain length among molecules. Further, each numerical value is not limited to an integer.

Further, in the composition of the fluororesin aqueous dispersion of the present invention, in addition to the non-ionic surfactant represented by the formula (1), a non-ionic surfactant having no oxybutylene groups, may be contained. The non-ionic surfactant having no oxybutylene groups may, for example, be a non-ionic surfactant having no oxybutylene groups in the formula (1), $C_{13}H_{27}O(C_2H_4O)_8H$, $C_{10}H_{21}CH(CH_3)CH_2O(C_2H_4O)_8H$, $C_{10}H_{21}CH(CH_3)CH_2O(C_2H_4O)_8H$, $C_{12}H_{25}O(C_2H_4O)_8H$, $C_8H_{17}O(C_2H_4O)_{10}H$, $C_{12}H_{25}O(C_2H_4O)_{10}H$, or $C_{13}H_{27}O(C_2H_4O)_{11}H$.

In a case where a non-ionic surfactant having no oxybutylene groups is contained, as an average value in the entire non-ionic surfactant, the number of oxybutylene groups per molecule of the non-ionic surfactant is preferably from 0.5 to 2, more preferably from 0.7 to 1.7, particularly preferably from 0.9 to 1.5. The non-ionic surfactant having no oxybutylene groups may be one separately added, or may be a non-ionic surfactant having no oxybutylene groups produced as a by-product during the preparation of the non-ionic surfactant represented by the formula (1). However, the latter is preferred. Further, the above non-ionic surfactant tends to be solid or semisolid in winter, and it may become difficult to handle. However, if it is dissolved in water in an amount of from 5 to 20 mass %, the viscosity will be low, and the handling will be easy. Otherwise, it may be preliminarily diluted with water or warm water so that the concentration will be from 5 to 40 mass %, and it may easily be dissolved.

In the composition of the fluororesin aqueous dispersion of the present invention, the content of the non-ionic surfactant of the formula (1) is usually from 2 to 12 mass %, preferably from 3 to 11 mass %, particularly preferably from 4 to 10 mass %, based on the fluororesin. If it is less than 2 mass %, the storage stability tends to be low, and cracks are likely to form in the fluororesin coating film, and cissing tends to be likely. In a case where it is incorporated in a large amount at a level of from 8 to 10 mass %, such is suitable particularly for applications where the coating is applied to be thick. However, if it is more than 12 mass %, fine cracks are likely to form in the fluororesin coating film.

The fluororesin aqueous dispersion of the present invention contains water as a dispersing medium for microparticles of a fluororesin. This water may be water contained in the aqueous fluororesin emulsion, or water prepared separately from the water in the aqueous fluororesin emulsion.

The fluororesin aqueous dispersion of the present invention may contain, as a case requires, a very small amount of at least one of a pH controlling agent such as ammonia, an anionic surfactant, a polyethylene oxide type thickening agent, a polyurethane type thickening agent, a thixotropy-imparting agent, a silicone type wettability-improving agent, a fluorinated wettability-improving agent, an antiseptic, etc. Further, at least one of a water-soluble organic solvent, an organic solvent such as toluene or xylene, a pigment such as titanium oxide, iron oxide, carbon black or cobalt blue, glass powder, hollow glass beads, graphite microparticles, silica microparticles, a colorant such as mica or titanium oxide-coated mica powder, etc., may be incorporated.

Especially when a polyethylene oxide type thickener having an average molecular weight of from 100,000 to 2,000,000, or a water-soluble polyurethane associated form thickener is incorporated in an amount of from 0.1 to 1.0 mass %, based on the mass of the fluororesin, the shear stability or stirring stability of the fluororesin aqueous dispersion may be improved.

As a method for concentrating a low concentration fluororesin aqueous dispersion, a known method such as a centrifugal sedimentation method, a phase separation method or electrophoresis method may be employed, as disclosed on p. 32 of Non-Patent Document 1.

The phase separation method is a method wherein the microparticles of the fluororesin are sedimented by heating them, followed by leaving them to stand for a certain time. Specifically, the non-ionic surfactant of the formula (1) is dissolved in the aqueous fluororesin emulsion in an amount of from 8 to 20 mass % based on the mass of the fluororesin to prepare a low concentration fluororesin aqueous dispersion, which is then heated from 50 to 100° C. and left to stand from 1 to 48 hours, whereupon the supernatant formed at the top is removed to obtain a high concentration fluororesin aqueous dispersion. The pH of the low concentration fluororesin aqueous dispersion before concentration is preferably at least 6, particularly preferably from 7 to 12, and such a pH can be adjusted by addition of a pH controlling agent such as aqueous ammonia.

The electrophoresis method is a method for recovering the high concentration fluororesin aqueous dispersion gathered on the surface of a semipermeable membrane by applying an electric power by utilizing the nature that the microparticles of the fluororesin are negatively charged. In such a case, the non-ionic surfactant of the formula (1) is dissolved in the aqueous fluororesin emulsion at a concentration of from 2 to 10 mass % based on the mass of the fluororesin to obtain a low concentration fluororesin aqueous dispersion. Then, a voltage of from 50 to 500 V/m is applied to subject the microparticles of the fluororesin to electrophoresis, whereupon the supernatant formed at the top is removed to obtain a high concentration fluororesin aqueous dispersion.

The fluororesin aqueous dispersion of the present invention may be one wherein the content of the anionic fluorinated surfactant of the formula (2) used for the emulsion polymerization, is removed or reduced during the process. Especially when the anionic fluorinated surfactant is to be removed from the fluorinated resin aqueous dispersion stabilized by the non-ionic surfactant of the formula (1), by means of an anion exchange resin, a higher removal efficiency can be obtained as compared with the case of a fluororesin aqueous dispersion stabilized by a conventional non-ionic surfactant. If the content of the anionic fluorinated surfactant becomes lower than a certain level, for example, if it becomes lower than 0.02 mass % based on the mass of the fluororesin, the concentration may become slow, but by adding the anionic surfactant other than the anionic fluorinated surfactant of the formula (2), such as ammonium laurate, triethanolamine laurate, sodium lauryl sulfate, ammonium lauryl sulfate or triethanolamine lauryl sulfate, in an amount of at most 0.2 mass % based on the mass of the fluororesin, the concentration may be facilitated. Further, such an additive is effective not only to facilitate the concentration of the fluororesin aqueous dispersion having the anionic fluorinated surfactant reduced, but also to improve the viscosity or the dispersion stability.

The viscosity of the fluororesin aqueous dispersion of the present invention is preferably at most 300 mPa·s, more preferably from 3 to 100 mPa·s, particularly preferably from 5 to 50 mPa·s, at 23° C., from the viewpoint of coating efficiency.

In the present invention, the thickening temperature of the fluororesin aqueous dispersion is preferably from 30 to 60° C., more preferably from 35 to 55° C., particularly preferably from 40 to 50° C. If the thickening temperature is too low, the viscosity change is likely due to a change of the coating temperature, such being undesirable. On the other hand, if the thickening temperature is too high, the surface tension of the liquid tends to be high, whereby cissing tends to be is likely. When the thickening temperature is within the above range, the viscosity change will be little, and no cissing tends to be likely.

The pH of the fluororesin aqueous dispersion of the present invention is preferably from 8.0 to 11.0, more preferably from 9.0 to 11.0, for the viscosity stability and the storage stability. For the pH control, ammonia or aqueous ammonia may preferably be added.

The surface tension of the fluororesin aqueous dispersion of the present invention is preferably from 24 to 30 mN/m, more preferably from 25 to 29 mN/m, particularly preferably from 26 to 28 mPa·s. If it is less than 24 mN/m, the defoaming property tends to deteriorate, such being undesirable, and if it is larger than 30 mN/m, cissing is likely, such being undesirable.

EXAMPLES

Now, the present invention will be described in further detail with reference to Examples and Comparative Examples, but it should be understood that the present invention is by no means thereby restricted. Examples 1 to 7 are Working Examples of the present invention, and the summary of the results is shown in Table 1. Examples 8 to 12 are Comparative Examples, and the summary of the results are shown in Table 2.

Further, non-ionic surfactants (a) to (g) used in the respective Examples correspond to non-ionic surfactants with the corresponding symbols in Table 3. The molecular structures of the non-ionic surfactants are shown in Table 3. The method for preparation of samples and the methods for evaluation of the respective items are shown below.

(A) PTFE concentration, surfactant concentration: Into an aluminum dish (mass: $W_0$), about 7 g of a PTFE aqueous dispersion was put, followed by weighing (mass: $W_1$), and the PTFE concentration and the surfactant concentration were obtained by the following formulae from the mass (mass: $W_2$) after drying at 120° C. for one hour and the mass (mass: $W_3$) after drying at 380° C. for 35 minutes. Here, in the present invention, the surfactant concentration is a numerical value including the non-ionic surfactant, the fluorinated surfactant and other thermal decomposition components.

PTFE concentration (mass %)=$[(W_3-W_0)/(W_1-W_0)] \times 100$

Surfactant concentration (mass %/PTFE)=$[(W_2-W_3)/(W_3-W_0)] \times 100$ (B) Fluorinated surfactant concentration: A calibration curve was prepared from peak areas preliminarily obtained from known concentrations of a fluorinated surfactant by means of LCMS (high performance liquid chromatography equipped with a mass analyzer). Then, a PTFE aqueous dispersion was dried at 70° C. for 16 hours, and then, the fluorinated surfactant was extracted with ethanol, and the peak area is measured by LCMS, whereupon using the calibration curve, the concentration of the fluorinated surfactant in the sample was obtained.

(C) pH: Measured by a glass electrode method.

(D) Viscosity, thickening temperature: By means of a Brookfield viscometer, the viscosity was measured at a liquid temperature of 23° C. at 60 rpm using #1 spindle. Further, the liquid temperature was raised between 17° C. and 60° C., whereby the temperature at which the viscosity at 23° C. has increased 50% by the temperature rise, was taken as the thickening temperature. Here, the thickening temperature being at least 40° C. was regarded as "good", and the thickening temperature being lower than 40° C. was regarded as "no good".

(E) Surface tension: Measured by a ring method using a platinum wire ring.

(F) Crack critical thickness: Using an applicator whereby the coating thickness continuously changes up to a thickness of 200 μm, a PTFE aqueous dispersion was applied on an aluminum plate having a thickness of 0.5 mm, dried at 120° C. for 10 minutes and then baked at 380° C. for 10 minutes. The PTFE coated film was observed, and the thicknesses of the forward ends of cracks formed were measured at five points by a palmer scope, and the average value was obtained and taken as the crack critical thickness. Here, the crack critical thickness being at least 10 µm was regarded as "good", and the crack critical thickness being less than 10 µm was regarded as "no good".

(G) Defoaming property: 100 ml of a PTFE aqueous dispersion was put into a measuring cylinder having a capacity of 500 ml, and air was blown thereinto by means of diffuser stones. After the height of bubbles became 200 mm, air was stopped, and the system was left to stand naturally. Ten minutes later, the height of bubbles was measured and taken as an index for the defoaming property. Here, the height of bubbles after ten minutes being at most 20 mm was regarded as the defoaming property being "good", and the height of bubbles exceeding 20 mm was regarded as "no good".

(H) Pump operation test (shear stability): A TYGON tube having an outer diameter of 7.9 mm and an inner diameter of 4.8 mm was mounted on a tubular pump manufactured by Cole Parmer Co., LTD. Both ends of the tube were put into a 200 cc beaker containing 100 cc of a PTFE aqueous dispersion, and the opening was covered with an aluminum foil to prevent the liquid from drying. Using such an apparatus, the PTFE aqueous dispersion was circulated for one hour at a liquid flow rate of 200 cc/min at a room temperature of 23° C., whereupon filtration was carried out by means of a 200 mesh nylon filter to collect agglomerates, which were dried at 120° C. for one hour, whereupon the mass was measured. Here, the amount of such agglomerates being at most 1 g was regarded as the shear stability being "good", and the amount exceeding 1 g was regarded as "no good".

(I) Coating test and outer appearance: A glass fiber cloth having a mass of 80 g/m$^2$ and a size of 10 cm×5 cm, was fired at 400° C. for one hour and immersed in a PTFE aqueous dispersion put in a beaker. It was withdrawn for coating, dried at 120° C. for 10 minutes and then fired at 380° C. for 10 minutes, and further, an operation of applying the PTFE aqueous dispersion, followed by drying and firing, was repeated six times, to prepare a PTFE-coated glass fiber cloth. The hue L*, a*, b* of the glass fiber cloth was measured by a SM color computer manufactured by Suga Test Instruments Co., Ltd., and the hue $L_0$*, $a_0$*, $b_0$* of the glass fiber cloth before coating was subtracted to obtain ΔL*, Δa*, Δb*. A case where the value of Δb* showing the yellowing was less than 3, was regarded as "good", and a case where it was at least 3, was regarded as "no good". Further, a case where cissing of the PTFE aqueous dispersion was observed during the coating, was regarded as "no good".

Example 1

Using ammonium perfluorooctanoate as an anionic fluorinated surfactant in an amount of 0.24 mass % based on the mass of PTFE obtained after the polymerization and using a disuccinic acid peroxide catalyst in an amount of 0.1 mass %, TFE was polymerized by an emulsion polymerization method to obtain an aqueous PTFE emulsion wherein the average molecular weight of PTFE was 3,000,000, the average particle diameter of PTFE was 0.25 µm, and the concentration of microparticles of PTFE was 28 mass %.

The average molecular weight of PTFE was obtained from the latent heat quantity by a differential thermoanalysis by a method disclosed by Suwa (J. Appl. Polym. Sci, 17, 3253 (1973)), and the average particle diameter of PTFE was obtained by drying the aqueous PTFE emulsion, followed by photography by means of a scanning electron microscope with 10,000 magnifications and measurements.

To this aqueous PTFE emulsion, a non-ionic surfactant (a) was dissolved in a proportion of 3 mass % based on the mass of PTFE, and concentration was carried out by electrophoresis. The supernatant was removed to obtain a high concentration PTFE aqueous dispersion having a PTFE concentration of 65.8 mass % and a surfactant concentration of 2.1 mass % based on the mass of PTFE.

To this high concentration PTFE aqueous dispersion, the non-ionic surfactant (a) was added in an amount of 2.7 mass % based on the mass of PTFE, and water and 500 ppm of aqueous ammonia were added, to obtain a PTFE aqueous dispersion having a PTFE concentration of 60.5 mass % and a surfactant concentration of 4.8 mass % based on the mass of PTFE. The viscosity of this PTFE aqueous dispersion at 23° C. was 20 mPs; pH=9.2; the surface tension was 27.2 (mN/m); and the height of bubbles after 10 minutes in the defoaming test was as low as 18 mm, and thus, the defoaming property was excellent.

Using this PTFE aqueous dispersion, the coating test was carried out on the glass fiber cloth, whereby no cissing was observed, no coloration of the coating film was observed, and the results were good. The evaluation results of the obtained PTFE aqueous dispersion are shown in Table 1.

Example 2

To the high concentration PTFE aqueous dispersion obtained in Example 1, the non-ionic surfactant (a) in an amount of 7.4 mass % based on the mass of PTFE, water and aqueous ammonia were added, to obtain a PTFE aqueous dispersion having a PTFE concentration of 55.5 mass % and a surfactant concentration of 9.5 mass % based on PTFE.

In the same manner as in Example 1, coating was applied six times on the glass fiber cloth, whereby no cissing was observed during the coating, and no coloration was observed on the glass fiber cloth after the firing.

The evaluation results of the obtained PTFE aqueous dispersion are shown in Table 1.

Example 3

To the same aqueous PTFE emulsion as in Example 1, a non-ionic surfactant (b) was dissolved in a proportion of 4 mass % based on the mass of PTFE, and concentration was carried out by electrophoresis. The supernatant was removed to obtain a high concentration PTFE aqueous dispersion having a PTFE concentration of 65.3 mass % and a surfactant concentration of 2.3 mass % based on the mass of PTFE.

To this high concentration PTFE aqueous dispersion, the non-ionic surfactant (a) was added in an amount of 6.7 mass % based on the mass of PTFE, and water and ammonia were added, to obtain a PTFE aqueous dispersion having a PTFE concentration of 55.4 mass % and a surfactant concentration of 9.0 mass % based on the mass of PTFE. Using this PTFE aqueous dispersion, coating was applied six times on the glass fiber cloth, whereby no cissing was observed during the coating, and no coloration was observed on the glass fiber cloth after the firing, and the outer appearance was excellent.

The evaluation results of the obtained PTFE aqueous dispersion are shown in Table 1.

Example 4

To the same aqueous PTFE emulsion as in Example 1, a non-ionic surfactant (a) was dissolved in a proportion of 15 mass % based on the mass of PTFE, and ammonia was added in an amount of 500 ppm based on the mass of PTFE to bring the pH to 9.7. Then, concentration was carried out by a phase separation method at 80° C. for 24 hours, and the supernatant was removed to obtain a high concentration PTFE aqueous dispersion having a PTFE concentration of 66.3 mass % and a surfactant concentration of 2.8 mass % based on the mass of PTFE.

Further, the non-ionic surfactant (a) was dissolved in a proportion of 2.0 mass % based on the mass of PTFE, to obtain a PTFE aqueous dispersion. The evaluation results of the obtained PTFE aqueous dispersion are shown in Table 1.

Example 5

Using the high concentration PTFE aqueous dispersion obtained in Example 4, the non-ionic surfactant (c) was dissolved in a proportion of 6.8 mass % based on the mass of PTFE to obtain a PTFE aqueous dispersion.

The evaluation results of the obtained PTFE aqueous dispersion are shown in Table 1.

Example 6

To the aqueous PTFE emulsion used in Example 1, the non-ionic surfactant (a) was dissolved in a proportion of 3 mass % based on the mass of PTFE, and an anion exchange resin Diaion (registered trademark) WA-30, manufactured by Mitsubishi Chemical Corporation was added in an amount of 3 mass % based on the mass of PTFE, followed by stirring for 48 hours, whereupon filtration was carried out by means of a 100 mesh filter to reduce the concentration of ammonium perfluorooctanoate to 0.006 mass % based on the mass of PTFE. Concentration was carried out for 30 hours by electrophoresis, to obtain a high concentration PTFE aqueous dispersion having a PTFE concentration of 66.1 mass % and a surfactant concentration of 2.2 mass % based on the mass of PTFE.

Then, to this high concentration PTFE aqueous dispersion, the non-ionic surfactant (a) was added in an amount of 2.8 mass % based on the mass of PTFE, and water and ammonia were added, to obtain a PTFE aqueous dispersion having a PTFE concentration of about 60.6 mass % and a surfactant concentration of 5.0 mass % based on PTFE.

The evaluation results of the obtained PTFE aqueous dispersion are shown in Table 1, and the physical properties were good.

Example 7

Using ammonium perfluorooctanoate in an amount of 0.25 mass % and a disuccinic acid peroxide catalyst in an amount of 0.02 mass % based on the mass of PTFE obtained after the polymerization, TFE was polymerized by an emulsion polymerization method to obtain an aqueous PTFE emulsion wherein the average molecular weight of PTFE was 15,000,000, the average particle diameter of PTFE was 0.30 μm, and the concentration of microparticles of PTFE was 25 mass %.

To this aqueous PTFE emulsion, the non-ionic surfactant (a) was dissolved in a proportion of 3 mass % based on the mass of PTFE to obtain a low concentration PTFE aqueous dispersion.

Then, using a transparent acrylic resin column having a diameter of 0.9 cm and a length of 100 cm, 50 cc of a weakly basic anion exchange resin Lewatit (registered trademark) MP62WS, manufactured by LANXESS, was packed (the packed length was about 80 cm), and about 1 liter of pure water was passed therethrough to have the ion exchange resin column ready.

Using a tubular pump, 10 L of the low concentration PTFE aqueous dispersion was passed through the ion exchange resin column at a rate of about 100 cc per hour. The concentration of ammonium perfluorooctanoate in the low concentration PTFE aqueous dispersion after the passing, was 0.008 mass % based on the mass of PTFE.

10.8 g of an aqueous ammonium laurate solution preliminarily prepared by mixing and dissolving 71.5 g of water, 10.1 g of aqueous ammonia (concentration: 28%) and 18.4 g of lauric acid, was dissolved in 10 L of the low concentration PTFE aqueous dispersion, and concentration was carried out over 20 hours by electrophoresis to obtain a high concentration PTFE aqueous dispersion having a PTFE concentration of 66.7 mass % and a surfactant concentration of 2.2 mass % based on the mass of PTFE.

Then, to this high concentration PTFE aqueous dispersion, the non-ionic surfactant (a) was added in an amount of 2.8 mass % based on the mass of PTFE, a polyethylene oxide having a molecular weight of 500,000 was added in an amount of 0.1 mass % based on the mass of PTFE, and water and ammonia were added, to obtain a PTFE aqueous dispersion having a PTFE concentration of about 60.8 mass % and a surfactant concentration of 5.1 mass % based on PTFE.

The evaluation results of the obtained PTFE aqueous dispersion are shown in Table 1, and the physical properties were good.

Example 8

To the same aqueous PTFE emulsion as in Example 1, the non-ionic surfactant (d) was dissolved in a proportion of 3 mass % based on the mass of PTFE, and concentration was carried out by electrophoresis. The supernatant was removed to obtain a high concentration PTFE aqueous dispersion having a PTFE concentration of 65.5 mass % and a surfactant concentration of 2.1 mass % based on the mass of PTFE.

Further, the non-ionic surfactant (d) was dissolved in a proportion of 2.7 mass % based on the mass of PTFE, to obtain a PTFE aqueous dispersion.

The surface tension of the obtained PTFE aqueous dispersion was high, and the defoaming property was poor, and the amount of agglomerates formed in the pump operation test was large, and also in the coating test on the glass fiber cloth, cissing was observed, such being undesirable.

The evaluation results are shown in Table 2.

Example 9

A PTFE aqueous dispersion was obtained in the same manner as in Example 8 except that the non-ionic surfactant (e) was used.

The evaluation results of the obtained PTFE aqueous dispersion are shown in Table 2, and in the coating test, remarkable cissing was observed.

Example 10

A PTFE aqueous dispersion was obtained in the same manner as in Example 8 except that the non-ionic surfactant (f) was used. The evaluation results of the obtained PTFE aqueous dispersion are shown in Table 2, and in the coating test, remarkable cissing was observed.

Example 11

A PTFE aqueous dispersion was obtained in the same manner as in Example 8 except that the non-ionic surfactant (g) was used. The evaluation results of the obtained PTFE aqueous dispersion are shown in Table 2, and the defoaming property was substantially inferior, in the coating test, cissing was observed, and the obtained sheet was colored yellow.

Example 12

To the aqueous PTFE emulsion obtained in Example 7, the non-ionic surfactant (d) was dissolved in a proportion of 2.8 mass % based on the mass of PTFE, to obtain a low concentration PTFE aqueous dispersion.

Then, under the same conditions as in Example 7, it was passed through the anion exchange resin column, but the concentration of ammonium perfluorooctanoate in the low concentration PTFE aqueous dispersion after the passing was 0.015 mass % based on the mass of PTFE.

10.8 g of the same aqueous ammonium laurate solution as in Example 7 was dissolved in 10 L of the low concentration PTFE aqueous dispersion, and concentration was carried out over 20 hours by electrophoresis to obtain a high concentration PTFE aqueous dispersion having a PTFE concentration of 65.8 mass % and a surfactant concentration of 2.2 mass % based on the mass of PTFE.

Then, to this high concentration PTFE aqueous dispersion, the non-ionic surfactant (d) was added in an amount of 2.8 mass % based on the mass of PTFE, and water and ammonia were added, to obtain a PTFE aqueous dispersion having a PTFE concentration of about 60.4 mass % and a surfactant concentration of 5.0 mass % based on PTFE.

The evaluation results of the obtained PTFE aqueous dispersion are shown in Table 2, but the amount of agglomerates formed in the pump operation test was large, and also in the coating test on the glass fiber cloth, cissing was observed, such being undesirable.

TABLE 1

| | Items | Ex. 1 | Ex. 2 | Ex. 3 | Ex. 4 | Ex. 5 | Ex. 6 | Ex. 7 |
|---|---|---|---|---|---|---|---|---|
| Aqueous PTFE emulsion | PTFE concentration (mass %) | 28 | 28 | 28 | 28 | 28 | 28 | 25 |
| | Fluorinated surfactant concentration (mass %/PTFE) | 0.24 | 0.24 | 0.24 | 0.24 | 0.24 | 0.006 | 0.008 |
| Non-ionic surfactant added to aqueous PTFE emulsion, added amount (mass %/PTFE) | | (a) 3 | (a) 3 | (b) 4 | (a) 15 | (a) 15 | (a) 3 | (a) 3 |
| Concentration method and concentration of high concentration PTFE aqueous dispersion | Method | Electrophoresis | Electrophoresis | Electrophoresis | Phase separation | Phase separation | Electrophoresis | Electrophoresis |
| | PTFE concentration (mass %) | 65.8 | 65.8 | 65.3 | 66.3 | 66.3 | 66.1 | 66.7 |
| | Surfactant concentration (mass %/PTFE) | 2.1 | 2.1 | 2.3 | 2.8 | 2.8 | 2.2 | 2.2 |
| Non-ionic surfactant added after concentration, added amount (mass %/PTFE) | | (a) 2.7 | (a) 7.4 | (a) 6.7 | (a) 2.0 | (c) 6.8 | (a) 2.8 | (a) 2.8 |
| Properties of PTFE aqueous dispersion after mixing | PTFE concentration (mass %) | 60.5 | 55.5 | 55.4 | 61.0 | 55.5 | 60.6 | 60.8 |
| | Surfactant concentration (mass %/PTFE) | 4.8 | 9.5 | 9.0 | 4.8 | 9.6 | 5.0 | 5.1 |
| | Fluorinated surfactant concentration (mass %/PTFE) | 0.151 | 0.151 | 0.162 | 0.102 | 0.102 | 0.004 | 0.006 |
| | pH | 9.2 | 9.2 | 9.5 | 9.9 | 9.8 | 9.3 | 9.6 |
| | Viscosity (mPa·s) 23° C. | 20 | 18 | 20 | 21 | 19 | 20 | 22 |
| | Thickening temperature (° C.) | 46 | 43 | 51 | 47 | 46 | 51 | 42 |
| | Surface tension (mN/m) | 27.2 | 26.8 | 26.9 | 27.2 | 26.9 | 27.6 | 27.2 |
| | Crack critical thickness (μm) | 13 | 32 | 23 | 14 | 32 | 14 | 13 |
| | Height of bubbles after 10 minutes (mm) | 18 | 16 | 16 | 18 | 17 | 18 | 17 |
| | Amount of agglomerates formed in pump operation test (g) | 0.56 | 0.51 | 0.48 | 0.52 | 0.58 | 0.65 | 0.25 |
| Coating test on glass fiber cloth | Outer appearance | White color no cissing | White color no cissing | White color no cissing | White color no cissing | White color no cissing | White color no cissing | White color no cissing |
| | ΔL* | −2.01 | −1.89 | −2.08 | −2.39 | −1.54 | −2.06 | −1.93 |
| | Δa* | 0.05 | 0.04 | 0.10 | 0.08 | 0.11 | 0.12 | 0.10 |
| | Δb* | 0.21 | 0.25 | 0.34 | 0.29 | 0.02 | 0.35 | 0.28 |
| | Judgment | Good | Good | Good | Good | Good | Good | Good |

TABLE 2

| | Items | Ex. 8 | Ex. 9 | Ex. 10 | Ex. 11 | Ex. 12 |
|---|---|---|---|---|---|---|
| Aqueous PTFE emulsion | PTFE concentration (mass %) | 28 | 28 | 28 | 28 | 25 |
| | Fluorinated | 0.24 | 0.24 | 0.24 | 0.24 | 0.015 |

TABLE 2-continued

| Items | | Ex. 8 | Ex. 9 | Ex. 10 | Ex. 11 | Ex. 12 |
|---|---|---|---|---|---|---|
| | surfactant concentration (mass %/PTFE) | | | | | |
| Non-ionic surfactant added to aqueous PTFE emulsion, added amount (mass %/PTFE) | | (d) 3 | (e) 3 | (f) 3 | (g) 3 | (d) 3 |
| Concentration method and concentration of high concentration PTFE aqueous dispersion | Method | Electro-phoresis | Electro-phoresis | Electro-phoresis | Electro-phoresis | Electro-phoresis |
| | PTFE concentration (mass %) | 65.5 | 65.7 | 65.7 | 66.1 | 65.8 |
| | Surfactant concentration (mass %/PTFE) | 2.1 | 2.1 | 2.1 | 2.2 | 2.2 |
| Non-ionic surfactant added after concentration, added amount (mass %/PTFE) | | (d) 2.7 | (e) 2.7 | (f) 2.7 | (h) 2.6 | (d) 2.8 |
| Properties of PTFE aqueous dispersion after mixing | PTFE concentration (mass %) | 60.5 | 60.5 | 60.5 | 60.5 | 60.4 |
| | Surfactant concentration (mass %/PTFE) | 4.8 | 4.8 | 4.8 | 4.8 | 4.8 |
| | Fluorinated surfactant concentration (mass %/PTFE) | 0.15 | 0.17 | 0.17 | 0.15 | 0.011 |
| | pH | 9.4 | 9.6 | 9.4 | 9.3 | 9.5 |
| | Viscosity (mPa·s) 23° C. | 20 | 18 | 21 | 19 | 20 |
| | Thickening temperature (° C.) | 38 | >60 | 55 | 37 | 33 |
| | Surface tension (mN/m) | 30.2 | 32.6 | 30.3 | 31.5 | 30.5 |
| | Crack critical thickness (μm) | 13 | 13 | 12 | 12 | 12 |
| | Height of bubbles after 10 minutes (mm) | 55 | 45 | 26 | 85 | 60 |
| | Amount of agglomerates formed in pump operation test (g) | 1.12 | 0.64 | 1.45 | 0.28 | 1.16 |
| Coating test on glass fiber cloth | Outer appearance | White color cissing observed | White color remarkable cissing observed | White color remarkable cissing observed | Yellow brown color cissing observed | White color cissing observed |
| | ΔL* | −2.01 | −1.89 | −1.89 | −5.54 | −1.87 |
| | Δa* | 0.05 | 0.04 | 0.07 | 0.51 | 0.13 |
| | Δb* | 0.21 | 0.25 | 0.29 | 4.74 | 0.71 |
| Judgment | | No good | No good | No good | No good | No good |

TABLE 3

| | Product name | Chemical formula |
|---|---|---|
| (a) | Newcol FAA03302 manufactured by Nippon Nyukazai Co., Ltd. (test product) | $C_{13}H_{27}OCH_2CH(C_2H_5)O(C_2H_4O)_8H$ |
| (b) | Newcol FAA06402 manufactured by Nippon Nyukazai Co., Ltd. (test product) | $C_{13}H_{27}OCH_2CH(C_2H_5)O(C_2H_4O)_{12}H$ |
| (c) | Newcol FAA07407 manufactured by Nippon Nyukazai Co., Ltd. (test product) | $C_{12}H_{25}OCH_2CH(C_2H_5)O(C_2H_4O)_7H$ |
| (d) | Newcol 1100 manufactured by Nippon Nyukazai Co., Ltd. | $C_{12}H_{25}O(C_2H_4O)_9H$ |
| (e) | Tergitol 15-S-12 manufactured by Dow Chemical Company | $C_{12\text{-}15}H_{25\text{-}31}O(C_2H_4O)_{12}OH$ |
| (f) | Newcol FAA05401 manufactured by Nippon Nyukazai Co., Ltd. (test product) | $C_{13}H_{27}O(C_2H_4O)_{12}CH_2CH(CH_3)OH$ |
| (g) | Triton X-100 manufactured by Dow Chemical Company | $C_8H_{17}C_6H_4O(C_2H_4O)_{10}OH$ |

The fluororesin aqueous dispersion of the present invention has characteristics such that as compared with conventional products, cissing is scarcely caused, the defoaming property is good so that defects are scarcely formed in the product, the coloration after baking is little so that the outer appearance is improved, and the thickening temperature is high so that the coating film thickness is stabilized. Therefore, it can be used more preferably for many applications in which conventional fluororesin dispersions have been used. For example, the fluororesin aqueous dispersion of the present invention is useful for many applications including e.g. an application for processing with various fluororesin coatings, an application for preparing fluororesin fibers, an application to prevent dusting of a powder and an application to mix it with a metal filler for processing into a lubricating bearing. Suitable specific examples include an application wherein the fluororesin aqueous dispersion is impregnated in a base material prepared by weaving heat resistant fibers such as glass fibers, aramide fibers, followed by firing at a temperature higher than the melting point of the fluororesin to process it into a heat resistant belt for transportation, a film structure sheet for building, or printed substrate material, an application wherein the fluororesin aqueous dispersion is impregnated in a base material made of woven fabric or knitted strings made of glass fibers, aramide fibers, carbon fibers, other various synthetic fibers or natural fibers, followed by drying to obtain packings, an application wherein a pigment or a heat resistant resin is incorporated to the fluororesin aqueous dispersion, and a kitchen utensil such as a frying pan or an electric rice-cooker is coated therewith for non-adhesion processing, an application wherein the composition of the fluororesin aqueous dispersion is processed into fluorinated resin fibers, an application wherein dusting is prevented by kneading it with a dusting powder by utilizing fibrillation of the fluororesin, an application to the production of batteries wherein it is kneaded together with an active material powder for bonding, an application wherein it is impregnated with a porous packing or a porous metal, an application wherein a coprecipitate of the fluororesin aqueous dispersion with a filler such as lead is obtained and then processed into an unrefueled bearing, an application wherein a fluororesin is added to a plastic powder in order to prevent dripping during the combustion of the plastic, an application to a fluororesin extremely thin sheet which is obtainable by applying the fluororesin aqueous dispersion to a heat resistant sheet material such as an aluminum plate or a stainless steel plate, firing it, followed by peeling the fluororesin layer, and other many applications in which conventional fluororesin dispersions have been used.

The entire disclosures of Japanese Patent Application No. 2006-191188 filed on Jul. 12, 2006, Japanese Patent Application No. 2006-210740 filed on Aug. 2, 2006, U.S. application No. 60/830,689 filed on Jul. 14, 2006 and U.S. application No. 60/835,872 filed on Aug. 7, 2006 including specifications, claims and summaries are incorporated herein by reference in their entireties.

What is claimed is:

1. A fluororesin aqueous dispersion comprising from 20 to 70 mass % of microparticles of a fluororesin and from 1 to 12 mass %, based on the mass of the fluororesin, of a non-ionic surfactant represented by the formula (1):

$$R^1\text{—O-A-X} \tag{1}$$

wherein $R^1$ is a $C_{6-18}$ alkyl group, O is an oxygen atom, A is a polyoxyalkylene group comprising from 1 to 3 oxybutylene groups and from 5 to 20 oxyethylene groups, and X is a hydrogen atom or a methyl group.

2. A polytetrafluoroethylene aqueous dispersion comprising from 20 to 70 mass % of microparticles of a polytetrafluoroethylene and from 1 to 12 mass %, based on the mass of the polytetrafluoroethylene, of a non-ionic surfactant represented by the formula (1):

$$R^1\text{—O-A-X} \tag{1}$$

wherein $R^1$ is a $C_{6-18}$ alkyl group, O is an oxygen atom, A is a polyoxyalkylene group comprising from 1 to 3 oxybutylene groups and from 5 to 20 oxyethylene groups, and X is a hydrogen atom or a methyl group.

3. The fluororesin aqueous dispersion according to claim 1, which contains, in addition to the non-ionic surfactant represented by the formula (1), a non-ionic surfactant having no oxybutylene groups, wherein as an average value in the entire non-ionic surfactant, the number of oxybutylene groups per molecule of the non-ionic surfactant is from 0.5 to 2.

4. The polytetrafluoroethylene aqueous dispersion according to claim 2, which contains, in addition to the non-ionic surfactant represented by the formula (1), a non-ionic surfactant having no oxybutylene groups, wherein as an average value in the entire non-ionic surfactant, the number of oxybutylene groups per molecule of the non-ionic surfactant is from 0.5 to 2.

5. The fluororesin aqueous dispersion according to claim 1, which further contains a fluorinated surfactant, wherein the content of the fluorinated surfactant is at most 0.2 mass % based on the mass of the fluororesin.

6. The polytetrafluoroethylene aqueous dispersion according to claim 2, which further contains a fluorinated surfactant, wherein the content of the fluorinated surfactant is at most 0.2 mass % based on the mass of the polytetrafluoroethylene.

7. The fluororesin aqueous dispersion according to claim 5, wherein the fluorinated surfactant is a fluorinated surfactant represented by the following formula (2):

$$R^2\text{—COOY} \tag{2}$$

wherein $R^2$ is a fluoroalkyl group having from 90 to 100% of hydrogen atoms in a $C_{5-9}$ alkyl group which may contain one or two etheric oxygen atoms, substituted by fluorine atoms, O is an oxygen atom, and Y is an ammonium ion.

8. The polytetrafluoroethylene aqueous dispersion according to claim 6, wherein the fluorinated surfactant is a fluorinated surfactant represented by the following formula (2):

$$R^2\text{—COOY} \tag{2}$$

wherein $R^2$ is a fluoroalkyl group having from 90 to 100% of hydrogen atoms in a $C_{5-9}$ alkyl group which may contain one or two etheric oxygen atoms, substituted by fluorine atoms, O is an oxygen atom, and Y is an ammonium ion.

* * * * *